(12) United States Patent
Murakami et al.

(10) Patent No.: US 7,327,813 B2
(45) Date of Patent: Feb. 5, 2008

(54) DIGITAL RECEIVING DEVICE AND RADIO COMMUNICATION SYSTEM

(75) Inventors: Yuichi Murakami, Chiryu (JP); Tomohiro Yamamoto, Anjo (JP); Akira Furuhashi, Takahama (JP); Kazunori Ono, Tokai (JP); Hiroki Okada, Toyota (JP)

(73) Assignees: Aisin Seiki Kabushiki Kaisha, Kariya-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 671 days.

(21) Appl. No.: 10/937,773

(22) Filed: Sep. 10, 2004

(65) Prior Publication Data

US 2005/0058232 A1    Mar. 17, 2005

(30) Foreign Application Priority Data

Sep. 11, 2003    (JP)    ............................. 2003-320025

(51) Int. Cl.
*H04B 1/10*    (2006.01)

(52) U.S. Cl. ...................... 375/350; 375/346; 375/349; 375/353; 455/307

(58) Field of Classification Search ................ 375/350, 375/346, 349, 353; 455/307
See application file for complete search history.

(56) References Cited

FOREIGN PATENT DOCUMENTS

| JP | 11-27099 | 1/1999 |
|---|---|---|
| JP | 2001-4736 A | 1/2001 |

*Primary Examiner*—Mohammed Ghayour
*Assistant Examiner*—Sonia J King
(74) *Attorney, Agent, or Firm*—Buchanan Ingersoll & Rooney PC

(57) ABSTRACT

A digital receiving device includes a detecting means for detecting a specific code under a signal receiving state capable of successively receiving a desired signal, a setting means for setting a period for detecting the specific code as a non-communication state period, an adaptive filter having an adaptive mode and a non-adaptive mode, the adaptive mode by which a filter coefficient is sequentially updated so as to remove an ambient noise during the non-communication state period, and the non-adaptive mode by which the filter coefficient is stopped from being updated during a period except for the non-communication state period under the signal receiving state and a filter controlling means for controlling an operation for switching the adaptive mode and the non-adaptive mode of the adaptive filter.

10 Claims, 4 Drawing Sheets

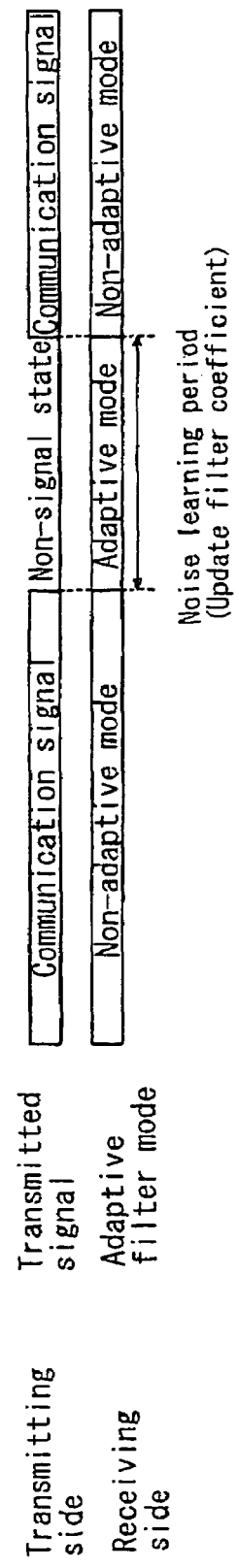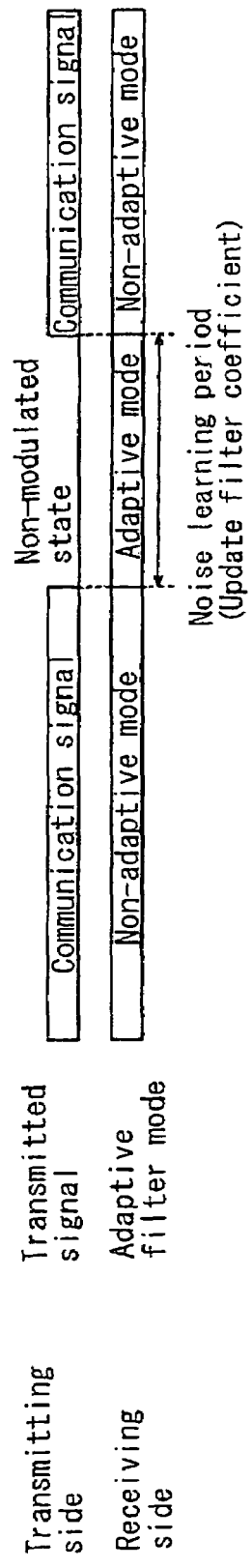

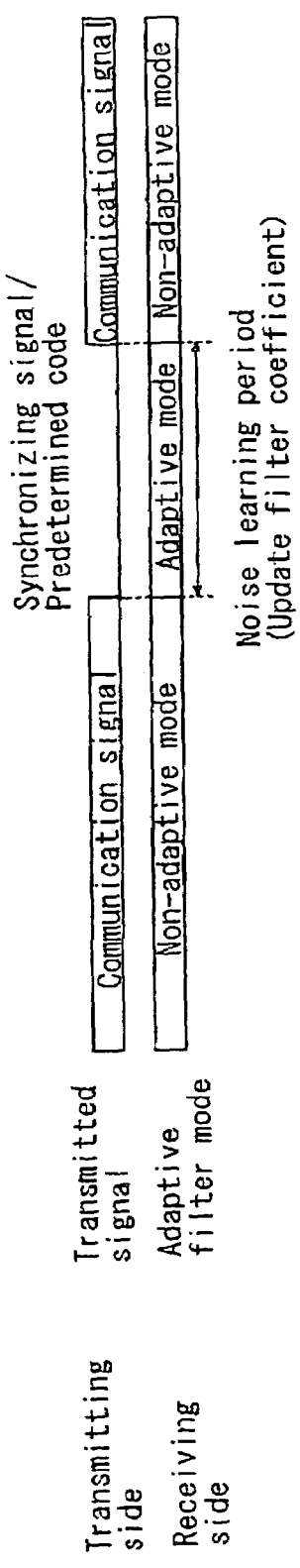
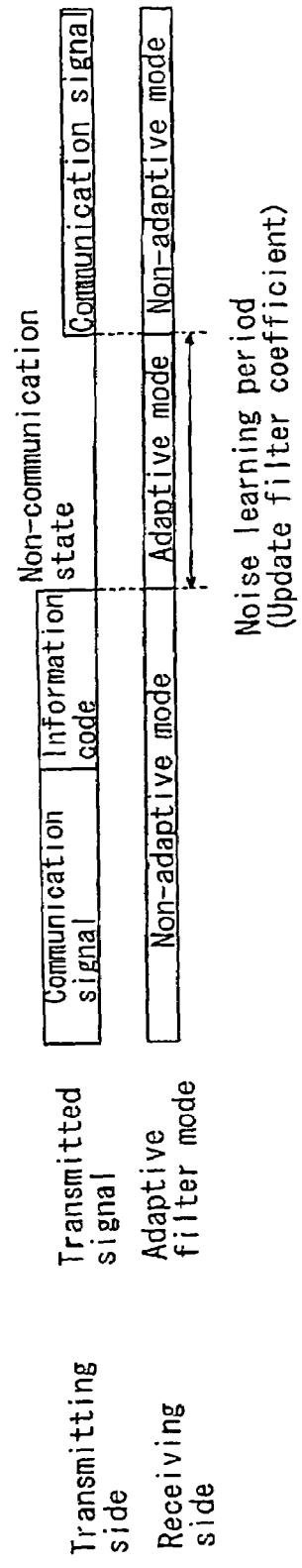

FIG. 3 Conventional work
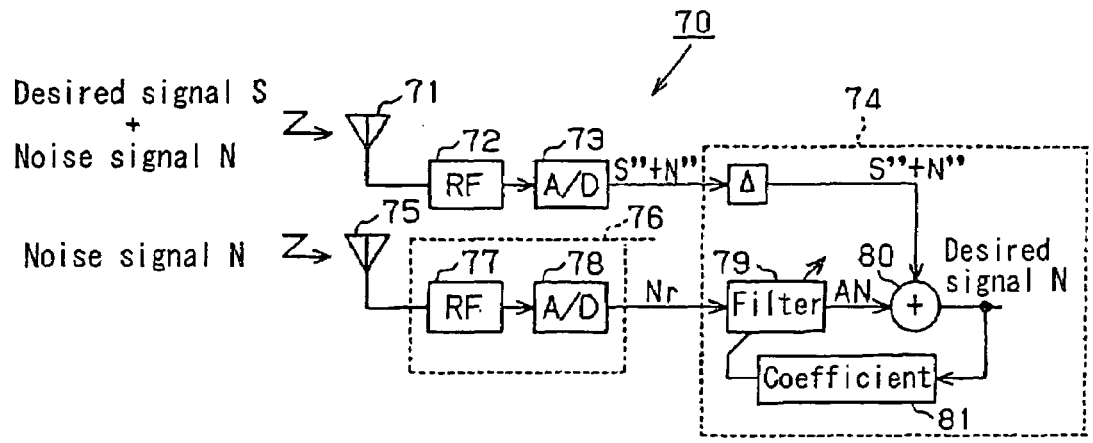

DIGITAL RECEIVING DEVICE AND RADIO COMMUNICATION SYSTEM

CROSS REFERENCE TO RELATED APPLICATIONS

This application is based on and claims priority under 35 U.S.C. §119 with respect to Japanese Patent Application 2003-320025, filed on Sep. 11, 2003, the entire content of which is incorporated herein by reference.

FIELD OF THE INVENTION

This invention generally relates to a digital receiving device and a radio communication system.

BACKGROUND

A conventional digital receiving device, which is adapted to remove a correlative noise signal (ambient noise), is disclosed in JP2001-4736A2, especially in FIG. 4 thereof. FIG. 3 is a block view generalizing the digital receiving device disclosed in the aforementioned application publication. As illustrated in FIG. 3, a digital receiving device 70 receives a desired signal S containing a correlated noise signal N by one antenna 71. The noise signal N is considered as an ambient noise. The digital receiving device 70 further down converts a signal transmitted from the antenna 72 to a signal at a predetermined frequency band by a high frequency conversion unit 72, forms a digital signal (S"+N") by analog/digital converting this signal at the predetermined frequency band by an analog/digital conversion unit (hereinafter, referred to as A/D conversion unit) 73. The digital signal (S"+N") corresponds to the desired signal S containing the noise signal N. The digital signal (S"+N") is outputted to a noise removable unit 74. Meanwhile, the digital receiving device 70 still further receives the noise signal N by the other antenna 75, down converts a signal transmitted from the antenna 75 to a signal at a predetermined frequency band by a high frequency conversion unit 77 of a reference noise signal outputting unit 76, and forms a reference noise signal Nr correlated to the noise signal N by analog/digital converting this signal at the predetermined frequency band at an A/D converting unit 78. The reference noise signal Nr is outputted to the noise removable unit 74.

The noise removable unit 74 forms a noise remove signal AN based upon the reference noise signal Nr at an adaptive filter portion 79, and removes the noise signal N by adding the noise remove signal AN and the digital signal (S"+N") at an adder 80. A filter coefficient of the adaptive filter portion 79 is sequentially updated so as to reduce the noise signal N (N") at a maximum degree by a filter coefficient updating portion 81.

A need exists for providing a digital receiving device and a radio communication system, both of which can effectively reduce an ambient noise without an enlargement of a circuit thereof.

SUMMARY OF THE INVENTION

According to an aspect of the present invention, a digital receiving device includes a detecting means for detecting a specific code under a signal receiving state capable of successively receiving a desired signal, a setting means for setting a period for detecting the specific code as a non-communication state period, an adaptive filter having an adaptive mode and a non-adaptive mode, the adaptive mode by which a filter coefficient is sequentially updated so as to remove an ambient noise during the non-communication state period, and the non-adaptive mode by which the-filter coefficient is stopped from being updated during a period except for the non-communication state period under the signal receiving state, and a filter controlling means for controlling an operation for switching the adaptive mode and the non-adaptive mode of the adaptive filter.

According to another aspect of the present invention, a radio communication system includes a transmitter for transmitting a desired signal, a signal receiving device capable of receiving the desired signal, a detecting portion adjusted to detect a specific code under a signal receiving state capable of successively receiving the desired signal, a storing portion adjusted to set a period for detecting the specific code as a non-communication state period, a adaptive filter having an adaptive mode and a non-adaptive mode, the adaptive mode by which a filter coefficient is sequentially updated so as to remove an ambient noise during the non-communication state period, and the non-adaptive mode by which the filter coefficient is stopped from being updated during a period except for the non-communication state period under the signal receiving state, and a filter controlling portion adjusted to control an operation for switching the adaptive mode and the non-adaptive mode of the adaptive filter.

BRIEF DESCRIPTION OF THE DRAWINGS

The foregoing and additional features and characteristics of the present invention will become more apparent from the following detailed description considered with reference to the accompanying drawings, wherein:

FIG. 2A is a timing chart for explaining operations at a transmitting side and a receiving side when a specific code is under a non-signal state;

FIG. 2B is a timing chart for explaining operations at the transmitting side and the receiving side when the specific code is under a non-modulated state;

FIG. 2C is a timing chart for explaining operations at the transmitting side and the receiving side when the specific code is a synchronizing code or a predetermined code;

FIG. 2D is a timing chart for explaining operations at the transmitting side and the receiving side when an information code is transmitted from the transmitting side to the receiving side; and FIG. 3 is a block view generalizing a conventional digital receiving device.

DETAILED DESCRIPTION

Figure 1:
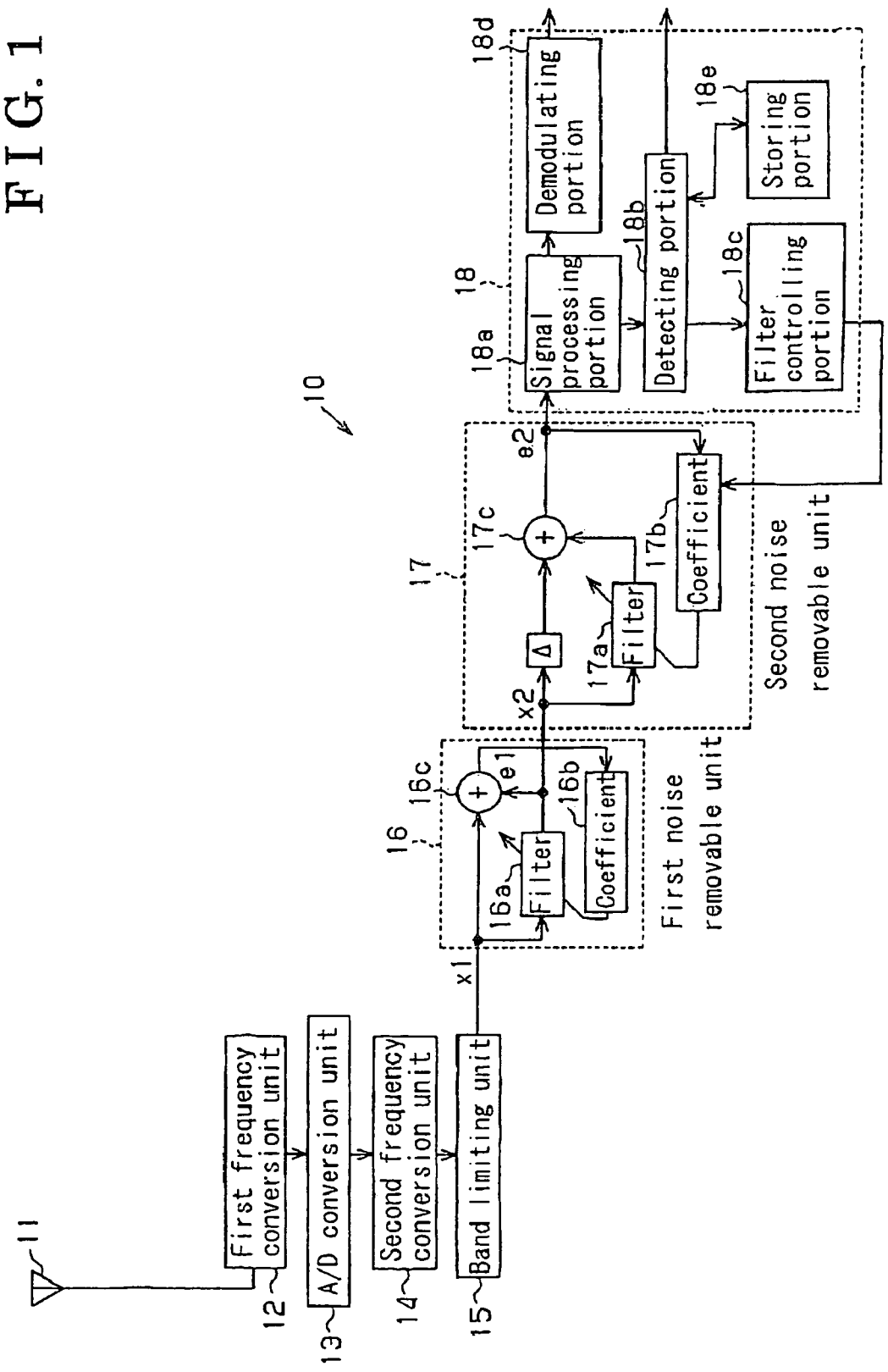
FIG. 1 is a block diagram illustrating a digital receiving device 10 according to an embodiment of the present invention.

An embodiment of the present invention will be described hereinbelow in detail with reference to the accompanying drawings.

With reference to FIG. 1, an FSK (Frequency Shift Keying) digital receiving device 10 receives a signal (hereinafter, referred to as desired signal) from a transmitter, e.g., from a transmitter carried by a user. A radio communication system is configured with this FSK digital receiving device 10 and the transmitter. An operation mode of the FSK digital receiving device 10 is specified by a signal receiving state, at which the FSK digital receiving device 10 successively receives the desired signal, and a signal receive stand-by state, at which the FSK digital receiving device 10 stands ready for receiving the desired signal. The FSK digital receiving device 10 sets a period, for which a specific code (described later) transmitted from the transmitter has been received and detected under the signal receiving state, as a non-communication state period. While the transmitter has transmitted the specific code in order to set the non-communication state period, any communication relevant to information transmit and receipt is interrupted.

As illustrated in FIG. 1, the FSK digital receiving device 10 is provided with an antenna 11, a first frequency conversion unit. 12, and A/D conversion unit 13; a second frequency conversion unit 14, a band limiting unit 15, a first noise removable unit 16, a second noise removable unit 17 and a processing unit 18.

Fundamentally, the antenna 11 is inputted with the desired signal. In more details, the antenna 11 is inputted with the desired signal and an ambient noise during a period under the signal receiving state except for the non-communication state period, and is inputted with the ambient noise both under the signal receive stand-by state and during the non-communication state period.

The FSK digital receiving device 10 down converts the signal from the antenna 11 into an intermediate frequency signal by the first frequency conversion unit 12, and forms a digital signal by analog/digital converting the intermediate frequency signal from the first frequency conversion unit 12 by an analog/digital conversion unit (hereinafter, referred to as A/D conversion unit) 13. The discrete digital signal is outputted to the second frequency conversion unit 14 from the A/D conversion unit 13.

The FSK digital receiving device 10 forms a baseband signal by converting the frequency of the digital signal from the A/D conversion unit 13 by the second frequency conversion unit 14 and outputs the baseband signal to the band limiting unit 15. The band limiting unit 15 forms a band limited signal by band-limiting the frequency of the baseband signal from the second frequency conversion unit 14. The band limited signal is outputted as a received signal xi to the first noise removable unit 16. The received signal x1 contains at least the ambient noise as a noise signal.

The first noise removable unit 16 is an adaptive filter (i.e., a first adaptive filter) capable of reducing a non-correlated noise of the ambient noise contained in the received signal x1. A white noise is a type of the non-correlated noise, as a non-limiting example. The first noise removable unit 16 includes a first adaptive filter portion 16a, of which filter coefficient varies in accordance with a frequency change of a correlated noise contained in the received signal x1, and a first filter coefficient updating portion 16b capable of sequentially updating the filter coefficient of the first adaptive filter portion 16a so as to reduce the non-correlated noise at a maximum degree. In the first noise limiting unit 16, the received signal x1 from the band limiting unit 15 is inputted to the first adaptive filter portion 16a. An error calculating portion. 16c forms an error signal e1 based upon the received signal x1 from the band limiting unit 15 and the received signal x1 via the first adaptive filter portion 16a. An attribute of the first adaptive filter portion 16a is optimized by inputting the error signal e1 to the first filter coefficient updating portion 16b.

As described above, according to the embodiment of the present invention, the FSK digital receiving device 10 forms an extracted signal x2 by removing or reducing the non-correlated noise from the received signal x1 at the first noise removable unit 16 and outputs the extracted signal x2 to the second noise removable unit 17. Therefore, the extracted signal x2 inputted into the second noise removable unit 17 corresponds to a signal containing the correlated noise. A stable frequency noise is a type of the correlated noise, as a non-limiting example.

The second noise removable unit 17 is an adaptive filter (i.e., an adaptive filter having an adaptive mode and a non-adaptive mode) capable of removing the extracted signal x2 from the first noise removable unit 16 as the correlated noise both under the signal receive stand-by state and during the non-communication state period under the signal receiving state. The second noise removable unit 17 includes a second adaptive filter portion 17a, of which filter coefficient varies in accordance with a frequency change of the extracted signal x2, and a second filter coefficient updating portion 17b (i.e., a filter coefficient updating portion) capable of sequentially updating the filter coefficient of the second adaptive filter portion 17a so as to remove or reduce the extracted signal x2. In the second noise removable unit 17, the extracted signal x2 is inputted to the second adaptive filter portion 17a. An error calculating portion 17c forms an error signal e2 based upon a signal via the second adaptive filter portion 17a. An attribute of the second adaptive filter portion 17a is optimized (an adaptive mode) by inputting the error signal c2 to the second filter coefficient updating portion 17b.

As described above, according to the embodiment of the present invention, the FSK digital receiving device 10 removes or reduces the extracted signal x2 from the first noise removable unit 16 as the correlated noise both under the signal receive stand-by state and during the non-communication state period under the signal receiving state. Therefore, the error signal e2 outputted to the processing unit 18 is basically a signal containing a noise at an approximately zero degree.

When a considerable frequency change of the error signal e2 is detected as a new signal at the processing unit 18, such as upon an ambient noise frequency changing occasion, a desired signal receiving occasion and so on, the filter coefficient of the second filter coefficient updating portion 17b is interrupted from being updated (a non-adaptive mode) by the processing unit 18. That is, the second adaptive filter portion 17a of the second noise removable unit 17 can possess the last filter coefficient immediately before the new signal detection. The update of the filter coefficient can be resumed at the second filter coefficient updating portion 17b by the processing unit 18 during the non-communication state period under the signal receiving state. In other words, the updated filter coefficient is transmitted to the second adaptive filter portion 17a of the second noise removable unit 17 during the non-communication state period. The second adaptive filter portion 17a can possess the last filter coefficient immediately before the non-communication state period is terminated. Therefore, the second noise removable unit 17 can remove or reduce the correlated signal corresponding to the signal receive stand-by state or the correlated signal corresponding to the non-communication state period as the correlated noise during the period except for the non-communication state period.

The processing unit 18 includes a signal processing portion 18a, a detecting portion 18b (i.e., a detecting means), a filter controlling portion 18c (i e., a filter controlling means), a demodulating portion 18d and a storing portion 18e (i.e., a setting means) for storing a specific code. The signal processing portion 18a is inputted with the error signal e2 from the error calculating portion 17c of the second noise removable unit 17 and calculates an autocorrelation.

The signal processing portion 18a outputs the error signal e2 as an correlation signal to the detecting portion 18b and the demodulating portion 18d.

The detecting portion 18b detects based upon the correlation signal from the signal processing portion 18a whether the desired signal exists. -The detecting portion 18b outputs the exist of the desired signal to an outer circuit (not illustrated). When the error 2 considerably varies such as upon the desired signal receiving moment, the detecting portion 18b detects the considerable change of the error signal 2 as the new signal. A detecting signal representing the new signal is outputted to the filter controlling portion 18c from the detecting portion 18b. In this case, the filter controlling portion 18c outputs a filter control signal to the second filter coefficient updating portion 17b so as to interrupt the update of the filter coefficient. On the other hand, when the filter controlling portion 18c is not inputted with the detecting signal from the detecting portion 18b, the filter controlling portion 18c allows the filter coefficient to be updated at the second filter coefficient updating portion 17b.

When the detecting portion 18b detects the exist of the desired signal, the detecting portion 18b outputs a signal for setting the non-communication state period to the filter controlling portion 18c after detecting the specific code from the transmitter. In this case, the filter controlling portion 18c resume the update of the filter coefficient at the second filter coefficient updating portion 17b by outputting the filter controlling signal thereto. While the specific code has been transmitted from the transmitter to the FSK digital receiving device 10, any communication relevant to information transmit and receive are interrupted as described above.

Next, following explanation will be given for explaining the specific code transmitted from the transmitter and methods of detecting the specific code with reference to FIGS. 2.

According to the embodiment of the present invention, a signal (electric wave) transmitted from the transmitter should not be transmitted to the FSK receiving device 10, which is one of conditions for setting the non-communication state period. In other words, the specific code from the transmitter should be under a non-signal state. The detecting portion 18b recognizes the specific code based upon a characteristic of the specific code under the non-signal state. As being explained in FIG. 2A, the second noise removable unit 17 at the receiving side is under the non-adaptive mode when the signal transmitted from the transmitting side such as the transmitter is a communication signal i.e., the desired signal. When the signal from the transmitting side is shifted to the non-signal state, the second noise removable unit 17 at the receiving side is shifted to the adaptive mode. The second noise removable unit 17 sequentially updates the filter coefficient thereof under the adaptive mode, thereby removing or reducing the ambient noise. The second noise removable unit 17 is returned to the non-adaptive mode when the signal from the transmitting side gets back to the communication signal, i.e., the desired signal.

Further, according to the embodiment of the present invention, the transmitting side transmits only a non-modulated carrier wave to the receiving side, which is one of the other conditions for setting the non-communication state period. In other words, the specific code from the transmitter should be under a non-modulated state. The detecting portion 18b recognizes the specific code based upon a characteristic of the specific code under the non-modulated state. FIG. 2B explains the operations at the transmitting side and the receiving side while the specific code is under the non-modulated state. The respective operations are substantially the same as the operations explained in FIG. 2A when the nor-signal state in FIG. 2A is replaced with the non-modulated state. Therefore, detailed explanation will be omitted herein.

Still further, according to the embodiment of the present invention, the transmitting side transmits a synchronizing signal or a specified known code at a certain period of time, which is one of the other conditions for setting the non-communication state period. In other words, the specific code from the transmitter should be a synchronizing code or a predetermined code. The detecting portion 18b recognizes the specific code based upon the characteristic of the specific code as the synchronizing code or the predetermined code. Especially when the specific code as the specified known code is transmitted from the transmitting side, the detecting portion 18b compares the code being transmitted from the transmitter with the specific code already stored at the storing portion 18e. When these two codes match each other, the detecting portion 18b recognizes the signal from the transmitter as the specific code. According to the embodiment of the present invention, the storing portion 18e has stored various codes for controlling the modes in the receiving side. The aforementioned specific code among the stored various codes is employed in order to set the non-communication state period. FIG. 2C explains the operations at the transmitting side and the receiving side while the specific code is either the synchronizing code or the predetermined code. The respective operations are substantially the same as the operations explained in FIG. 2A when the non-signal state in FIG. 2A is replaced with the synchronizing code or the predetermined code. Therefore, detailed explanation will be omitted herein.

As described above according to the embodiment of the present invention, the specific code transmitted from the transmitting side can be detected by any above-described methods, thereby enabling to improve a versatility of the transmitter for setting the non-communication state period. In other words, as far as the transmitter can transmit any one of the signals or codes described above to the FSK receiving device 10, the non-communication state period can be established at the FSK receiving device 10.

The demodulating portion 18d demodulates the desired signal based upon the correlation signal from the signal processing portion 18a and outputs this demodulated signal to an outer circuit (not illustrated).

At least following effects can be yielded according to the embodiment of the present invention.

(1) The period of time for detecting the specific time is set as the non-communication state period while the desired signal from the transmitter has been received at the receiving side. In this case, the second noise removable unit 17 sequentially updates the filter coefficient thereof in order to remove or reduce the ambient noise in accordance with the adaptive filter mode. Meanwhile, the second noise removable unit 17 interrupts the filter coefficient from being updated in accordance with the non-adaptive mode during the period except for the non-communication state period under the signal receiving state. That is, while the second noise removable unit 17 is under the non-adaptive mode, the second noise removable unit 17 removes or reduces the ambient noise by use of the filter coefficient which was updated in order to reduce the ambient noise during the adaptive mode. Therefore, even while the desired signal transmitted from the transmitter has been successively received by the receiving device 10, the second noise removable unit 17 can learn the ambient noise, further can remove or reduce the ambient noise, by defining the non-communication state period on purpose. Further, during the period except for the non-communication state period under the signal receiving state, the second noise removable unit 17 can remove or reduce only the ambient noise even if the ambient noise and the desired signal are correlated, thereby enabling to effectively receive the desired signal. Still further, even if the desired signal and the ambient noise are correlated, the desired signal and the ambient noise can be selectively received at the receiving side by controlling the shift operation of the adaptive and non-adaptive modes. The circuit of the FSK receiving device 10 according to the embodiment of the present invention can be downsized than a circuit of a receiving device capable of receiving the ambient noise and the desired signal independently. For example, the FSK receiving device 10 is not required with an antenna for receiving the noise signal and an output circuit for a reference noise signal, both of which are provided with the receiving device disclosed in JP2001-4736A2.

(2) The non-communication state period is set by detecting one of the silent code, the non-modulated code, the synchronizing code, the predetermined code by the detecting portion 18b. Therefore, the non-communication state period can be set by various types of specific codes. Further, the versatility of the transmitter for setting the non-communication state period can be effectively expanded.

(3) The non-correlated noise can be removed or reduced by the first noise removable unit 16. Further, the correlated noise can be removed or reduced by the second noise removable unit 17 in accordance with the adaptive mode.

(4) An analog receiving device is required to receive the desired signal of which frequency is greater than the noise frequency when the noise exists in a certain frequency band. That is, when the noise in the certain frequency band is greater than the frequency of the desired signal, the desired signal, i.e., an FSK signal, may not be able to be demodulated. However, according to the embodiment of the present invention, the digital receiving device 10 is employed as a signal receiving device. Therefore, even when the noise frequency is greater than the frequency of the desired signal, the desired signal can be effectively demodulated.

Following modifications can be applied to the above-described embodiment of the present invention, as non-limiting examples.

The transmitter can transmit an information code in order to notify the receiving side the shift operation to the non-communication state period. The non-communication state period can be inserted into the period under the signal receiving state after the information code transmission. As being explained in FIG. 2D, the second noise removable unit 17 at the receiving side is under the non-adaptive mode when the signal transmitted from the transmitting side such as the transmitter is the communication signal, i.e., the desired signal. When the signal from the transmitting side is shifted to the information code, the second noise removable unit 17 still remains under the non-adaptive mode. After transmitting the information code to the receiving side, the non-communication state period is inserted for a certain period of time under the signal receiving state. At this point, the second noise removable unit 17 is shifted to the adaptive mode. The second noise removable unit 17 sequentially updates the filter coefficient thereof under the adaptive mode, thereby removing or reducing the ambient noise. The second noise removable unit 17 is returned to the non-adaptive mode when the information code from the transmitting side gets back to the communication signal, i.e., the desired signal. In this case, the specific code does not have to be transmitted from the transmitting side to the receiving side simply for setting the non-communication state period, thereby enabling to reduce consumption electric power. Further, the detecting portion 18b does not have to repeatedly detect the specific code, thereby enabling to reduce computing load.

According to the embodiment of the present invention, the FSK digital receiving device is employed as a digital receiving device. Alternatively, an ASK (Amplitude Shift Keying) digital receiving device and a PSK (Phase Shift Keying) digital receiving device can be employed as the digital receiving device.

The digital receiving device according to the embodiment of the present invention can be applied as a vehicle digital receiving device. The vehicle digital receiving device can be employed for locking/unlocking a vehicle door, for recognizing an engine activation start/stop and so on by a wireless communication between the receiving side and a transmitter carried by a user. Further, the vehicle digital receiving device can be employed as a system for controlling operations of various electric devices such as a power window device, a slide door device, a sun roof device, a seat device for a physically handicapped people, and so on. That is, the vehicle digital receiving device can be employed as a system capable of setting the non-communication state period under the signal receiving state. Still further, the technology above described can be widely utilized for the wireless communication such as a TV station and a radio station, each of which requires a broadcast wave.

Technical idea yielded from the above-identified embodiment and modifications is described below along with the effects thereof.

The adaptive filter of the digital receiving device described above includes the adaptive filter portion, of which filter coefficient can be changed in response to the change of the frequency of the ambient noise, and the filter coefficient updating portion capable of sequentially updating the filter coefficient of the adaptive filter portion so as to remove or reduce the ambient noise at a maximum degree.

6) The adaptive filter of the digital receiving device described above includes the first adaptive filter capable of reducing the non-correlated noise and the second adaptive filter. The second adaptive filter can be shifted between the adaptive mode and the non-adaptive mode by the filter controlling means and can remove or reduce the correlated noise. When the second adaptive filter is under the adaptive mode, the correlated noise can be removed or reduced.

The digital receiving device described above includes the detecting means for detecting a specific code under a signal receiving state capable of successively receiving a desired signal, the setting means for setting a period for detecting the specific code as a non-communication state period, the adaptive filter having the adaptive mode and the non-adaptive mode, the adaptive mode by which the filter coefficient is sequentially updated so as to remove the ambient noise during the non-communication state period, and the non-adaptive mode by which the filter coefficient is not allowed to be updated during a period except for the non-communication state period under the signal receiving state, and the filter controlling means for controlling the operation for switching the adaptive mode and the non-adaptive mode.

Once the specific code is detected under the signal receiving state, the predetermined period for detecting the specific cod is set as the non-communication state period. Therefore, there is no need to keep transmitting the specific code in order to set the non-communication state period. The desired signal can be set not to be transmitted during the predetermined period after the specific code transmission. In this case, the adaptive filter sequentially updates the filter coefficient thereof in accordance with the adaptive mode so as to remove or reduce the ambient noise. Meanwhile, during the period except for the non-communication state period under the signal receiving state, the adaptive filter interrupts the filter coefficient from being updated in accordance with the non-adaptive mode. That is, in the non-adaptive mode, the adaptive filter removes or reduces the ambient noise by use of the filter coefficient which was updated in the adaptive mode in order to remove the ambient noise. Therefore, even if the digital receiving device is employed under the signal receiving state, the adaptive filter can learn the ambient noise during the non-communication state period by intentionally defining the non-communication state period under the signal receiving state.

Further, even if the ambient noise and the desired signal are correlated during the period except of r the non-communication state period under the signal receiving state, the adaptive filter can remove only the ambient noise, thereby enabling to effectively receive the desired signal.

Still further, even if the desired signal and the ambient noise are correlated, the desired signal and the ambient noise can be selectively received at the receiving side by controlling the shift operation of the adaptive and non-adaptive modes. The circuit of the FSK receiving device 10 according to the embodiment of the present invention can be downsized than a circuit of a receiving device capable of receiving the ambient noise and the desired signal independently.

The principles, the preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A digital receiving device comprising:
a detecting means for detecting a specific code under a signal receiving state capable of successively receiving a desired signal;
a setting means for setting a period for detecting the specific code as a non-communication state period;
an adaptive filter having an adaptive mode and a non-adaptive mode, the adaptive mode by which a filter coefficient is sequentially updated so as to remove an ambient noise during the non-communication state period, and the non-adaptive mode by which the filter coefficient is stopped from being updated during a period except for the non-communication state period under the signal receiving state; and
a filter controlling means for controlling an operation for switching the adaptive mode and the non-adaptive mode of the adaptive filter.

2. A digital receiving device according to claim 1, wherein the specific code is under a non-signal state, and the filter coefficient of the adaptive filter is sequentially updated so as to remove the ambient noise during a period of the non-signal state.

3. A digital receiving device according to claim 1, wherein the specific code is under a non-modulated state, and the filter coefficient of the adaptive filter is sequentially updated so as to remove the ambient noise during a period of the non-modulated state.

4. A digital receiving device according to claim 1, wherein the specific code is a synchronizing code, and the filter coefficient of the adaptive filter is sequentially updated so as to remove the ambient noise while the specific code as the synchronizing code has been detected.

5. A digital receiving device according to claim 1, wherein the specific code is a predetermined code, and the filter coefficient of the adaptive filter is sequentially updated so as to remove the ambient noise while the specific code as the predetermined code has been detected.

6. A digital receiving device according to claim 1, wherein the desired signal includes an information code for notifying the digital receiving device that the non-communication state period is set by the selling means in response to the detection of the specific signal.

7. A digital receiving device comprising:
a detecting portion adjusted to detect a specific code under a signal receiving state capable of successively receiving a desired signal;
a storing portion adjusted to set a period for detecting the specific code as a non-communication state period;
an adaptive filter having an adaptive mode and a non-adaptive mode, the adaptive mode by which a filter coefficient is sequentially updated so as to remove an ambient noise during the non-communication state period, and the non-adaptive mode by which the filter coefficient is stopped from being updated during a period except for the non-communication state period under the signal receiving state; and
a filter controlling portion adjusted to control an operation for switching the adaptive mode and the non-adaptive mode of the adaptive filter.

8. A digital receiving device according to claim 7 further comprising:
an adaptive filter portion of the adaptive filter, a filter coefficient of the adaptive filter portion adjusted to be changed in response to a change of a frequency of an ambient noise; and
a filter coefficient updating portion capable of sequentially updating the filter coefficient of the adaptive filter portion, wherein the adaptive filter removes a correlated noise contained in the ambient noise.

9. A radio communication system comprising:
a transmitter for transmitting a desired signal;
a signal receiving device capable of receiving the desired signal;
a detecting portion adjusted to detect a specific code under a signal receiving state capable of successively receiving the desired signal;
a storing portion adjusted to set a period for detecting the specific code as a non-communication state period;

an adaptive filter having an adaptive mode and a non-adaptive mode, the adaptive mode by which a filter coefficient is sequentially updated so as to remove an ambient noise during the non-communication state period, and the non-adaptive mode by which the filter coefficient is stopped from being updated during a period except for the non-communication state period under the signal receiving state; and a filter controlling portion adjusted to control an operation for switching the adaptive mode and the non-adaptive mode of the adaptive filter.

10. A radio communication system according to claim 9 further comprising:

an adaptive filter portion of the adaptive filter, a filter coefficient of the adaptive filter portion adjusted to be changed in response to a change of a frequency of an ambient noise; and a filter coefficient updating portion capable of sequentially updating the filter coefficient of the adaptive filter portion, wherein the adaptive filter removes a correlated noise contained in the ambient noise.

* * * * *